(12) United States Patent
Isoda

(10) Patent No.: US 6,315,924 B1
(45) Date of Patent: Nov. 13, 2001

(54) TERBIUM-SAMARIUM CO-ACTIVATED ALKALINE EARTH METAL RARE EARTH OXIDE PHOSPHOR

(75) Inventor: Yuji Isoda, Ashigarakami-gun (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/456,499

(22) Filed: Dec. 8, 1999

(30) Foreign Application Priority Data

Dec. 8, 1998 (JP) .................................................. 10-348952

(51) Int. Cl.$^7$ ..................................................... C09K 11/61
(52) U.S. Cl. .................................. 252/301.4 R; 250/459.1
(58) Field of Search .................. 252/301.4 R; 250/459.1

(56) References Cited

U.S. PATENT DOCUMENTS 3,450,642 * 6/1969 Hoffman ........................ 252/301.4 R
3,450,643 * 6/1969 Hoffman ........................ 252/301.4 R
5,391,884 * 2/1995 Sieber et al. ................... 252/301.4 R

* cited by examiner

Primary Examiner—C. Melissa Koslow
(74) Attorney, Agent, or Firm—Sughrue, Mion, Zinn, Macpeak & Seas, PLLC

(57) ABSTRACT

A terbium-samarium co-activated alkaline earth metal rare earth oxide phosphor which is composed of an oxygen atom and a composition of the formula (I):

$$M^{II}M^{III}_2:xTbySm \qquad (I)$$

[$M^{II}$ is Mg, Ca, Sr or Ba; $M^{III}$ is Y, La, Gd or Lu; and x and y are numbers of $0<x\leq0.1$ and $0<y\leq0.1$] produces with time difference plural emissions having different colors by application of radiations such as X-rays and UV-light, so that the phosphor can be employed as a switching element or a display element giving color changing.

9 Claims, 10 Drawing Sheets

TERBIUM-SAMARIUM CO-ACTIVATED ALKALINE EARTH METAL RARE EARTH OXIDE PHOSPHOR

FIELD OF THE INVENTION

The present invention relates to a terbium-samarium co-activated rare earth activated alkaline earth metal rare earth oxide phosphor, and its use as a switching element, a delay element, or a display element.

BACKGROUND OF THE INVENTION

A phosphor emits a light by applying radiations such as UV light, electron beams, or X-rays, or by application of electric fields. Various phosphors have been hitherto studied and practically used for various purposes such as illumination (luminescent lamps), image displaying, and radiation measurement. Display devises comprising phosphors are also known, for instance, CRT and VFD. On the other hand, a switching element or device works for switching between the states of "on" and "off", and a delay element or device works for making a delay of transmission of signals.

U.S. Pat. No. 5,391,884 discloses a phosphor and an X-ray imaging plate comprising the phosphor. The disclosed phosphor contains an activated gadolinate host, and the host is essentially composed of the complex composition having the following formula:

$$BaGd_2O_4{:}yTb{,}zSm$$

wherein, y and z are numbers satisfying the conditions of $0<y<1$, $0<z<5$, and $1\times10^{-5}<y+z<6.0$). SUMMARY OF THE INVENTION The present inventor made studies about rare earth activated divalent metal-trivalent metal oxide phosphors, and finally found the following facts.

When a terbium-samarium co-activated alkaline earth metal rare earth oxide phosphor is excited with a radiation (e.g., UV light X-ray), it emits luminescence comprising both green component (which is thought to originate from $Tb^{3+}$) and red one (which is thought to originate from $Sm^{3+}$). Each luminescent component has a different response time to the excitation, and the ratio between them depends on the alkaline earth metal and the rare earth (which are the center metal atoms in the phosphor matrix). Therefore, the time difference between these luminescent components can be controlled by selecting the center metal atoms in the phosphor matrix.

Accordingly, it is an object of the present invention to provide a phosphor suiting display material and showing dichromatic emission with a time difference.

It is another object of the invention to provide a phosphor appropriately employable as a switching or delay element or device and showing dichromatic emission with a time difference.

The invention resides in a method for displaying plural colors with time difference which comprises applying radiation to a terbium-samarium co-activated alkaline earth metal rare earth oxide phosphor which is composed of a composition of the formula (I):

$$M''M'''_2O_4{:}xTb{,}ySm \qquad (I)$$

in which $M''$ is at least one alkaline earth metal element selected from the group consisting of Mg, Ca, Sr and Ba; $M'''$ is at least one rare earth element selected from the group consisting of Y, La, Gd and Lu; and x and y are numbers satisfying the conditions of $0<x\leq0.1$ and $0<y\leq0.1$, respectively, to produce with time difference plural emissions of different wavelengths.

The invention also resides in a method for transmitting plural signals with time difference which comprises applying radiation to a terbium-samarium co-activated alkaline earth metal rare earth oxide phosphor which is composed of a composition of the formula (I):

$$M''M'''_2O_4{:}xTb{,}ySm \qquad (I)$$

in which $M^{11}$ is at least one alkaline earth metal element selected from the group consisting of Mg, Ca, Sr and Ba; $M'''$ is at least one rare earth element selected from the group consisting of Y, La, Gd and Lu; and x and y are numbers satisfying the conditions of $0<y\leq0.1$ and $0<y\leq0.1$, respectively, to produce with time difference plural emissions of different wavelengths and collecting the plural emissions separately by plural photoelectric conversion elements which emit electric signals with time difference.

The invention furthermore resides in a terbium-samarium co-activated barium rare earth oxide phosphor comprising the composition represented by the formula (I"):

$$BaM'''_2O_4{:}xTb{,}ySm \qquad (I'')$$

in which $M'''$ is at least one rare earth element selected from the group consisting of Y, La and Lu; and x and y are numbers satisfying the conditions of $0<x\leq0.1$ and $0<y\leq0.1$, respectively.

DETAILED DESCRIPTION OF THE INVENTION

The process for preparing a terbium-samarium co-activated alkaline earth metal rare earth oxide phosphor of the invention was described below in detail.

In the first place, an alkaline earth metal oxide and a rare earth oxide (which form in combination a precursor of the matrix) and terbium oxide and samarium oxide (which are oxides of the activator) are pulverized and mechanically stirred to mix well. The obtained mixture is placed in a heat-resistance container such as an alumina crucible, a quartz boat or crucible, and then fired in an electric furnace. A preferred temperature for the firing is in the range of 1,100 to 1,300° C., and more preferably is approx. 1,200° C. As the firing atmosphere, a nitrogen gas atmosphere is preferred. The firing period is determined upon various conditions such as the amount of the mixture placed in the container, the firing temperature, and the temperature at which the product is taken out of the furnace. It generally is in the range of 1 to 5 hours, preferably 2 to 4 hours.

After the firing, the temperature in the furnace is lowered and then the fired product is taken out. The product can be further subjected to various known treatments such as pulverizing and sieving, if needed.

The process can thus give the objected terbium-samarium co-activated alkaline earth metal rare earth oxide phosphor comprising the composition represented by the formula (I):

$$M^{II}M^{III}{}_2O_4{:}xTb,ySm \qquad (I)$$

(wherein $M^{II}$ is at least one alkaline earth metal element selected from the group consisting of Mg, Ca, Sr and Ba; $M^{III}$ is at least one rare earth element selected from the group consisting of Y, La, Gd and Lu; and x and y are numbers satisfying the conditions of $0 < x \leq 0.1$ and $0 < y \leq 0.1$, respectively).

Preferably, $M^{II}$ is Sr and/or Ba. $M^{III}$ is also preferably Y and/or Gd. Further, x and y preferably satisfy the conditions of $0.0001 \leq x \leq 0.01$ and $0.00001 \leq y 0.001$, respectively The emission property of the phosphor of the invention is described below by referring to the attached drawings.

Figure 1:
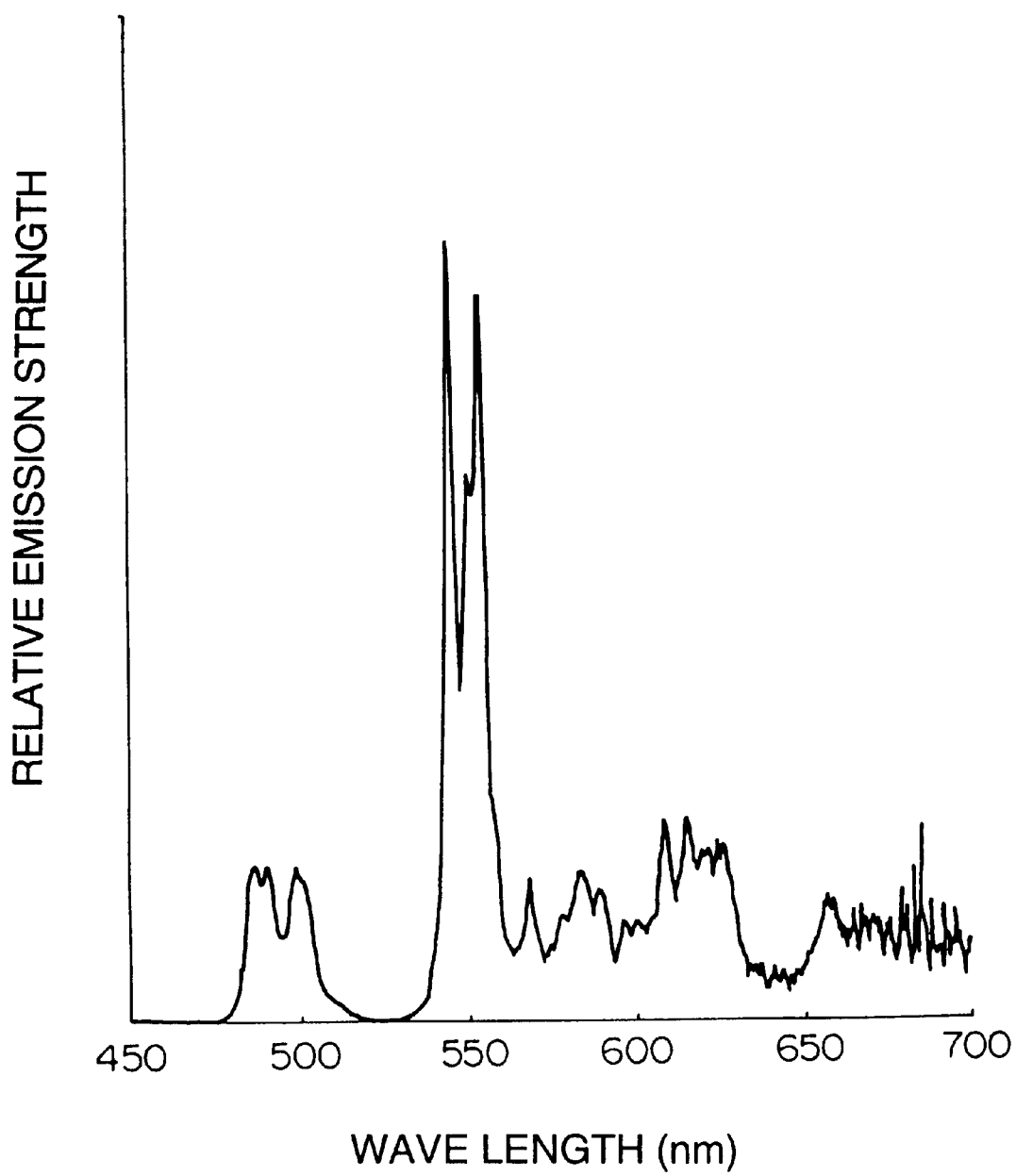
FIG. 1 shows the emission spectrum of $BaGd_2O_4$: 0.002Tb,0.0002Sm phosphor (Example 1) excited with X-rays.
Figure 2:
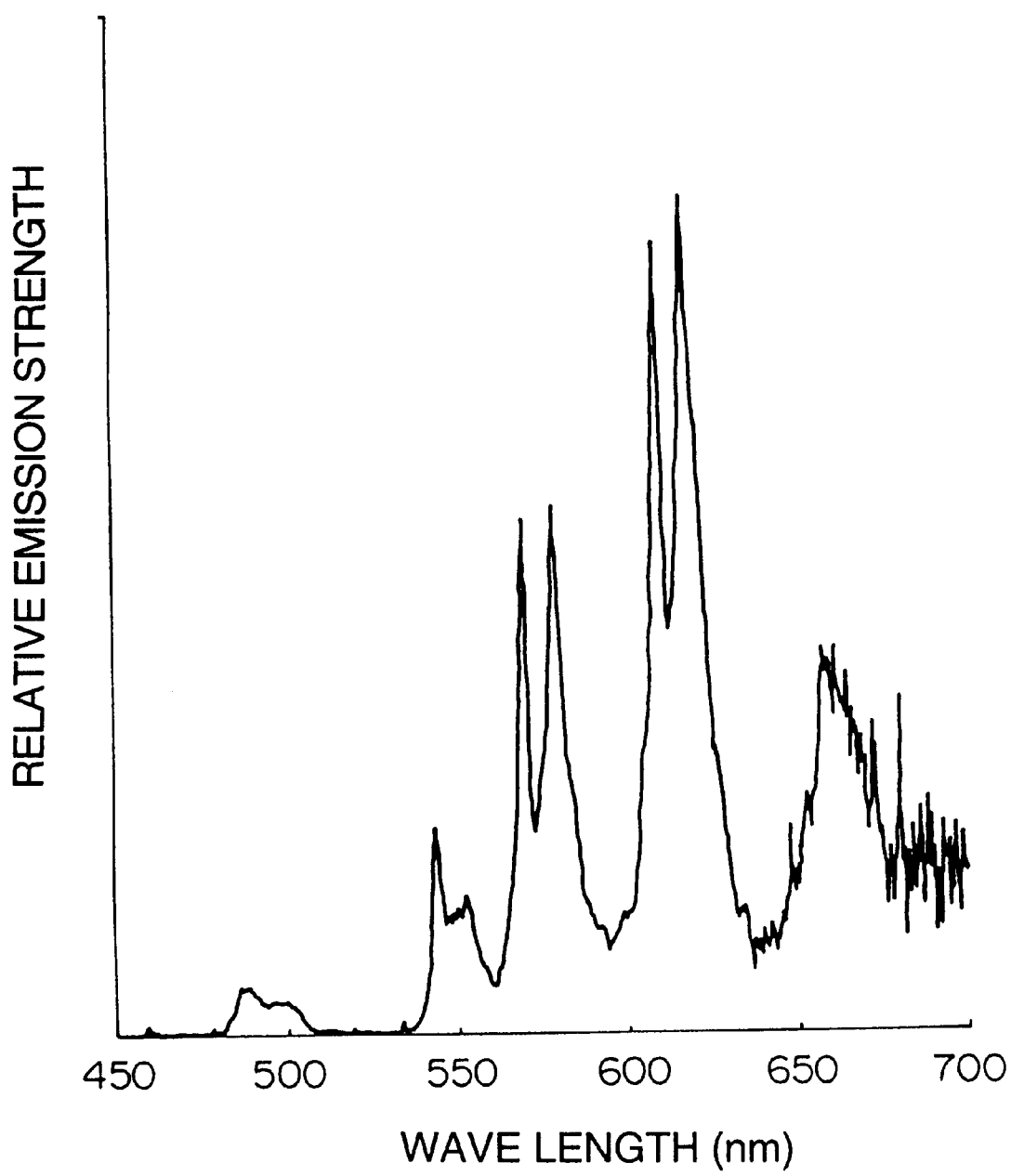
FIG. 2 shows the emission spectrum of $BaY_2O_4$: 0.002Tb, 0.0002Sm phosphor (Example 2) excited with X-rays.

FIG. 1 shows the emission spectrum of $BaGd_2O_4$: 0.002Tb,0.0002Sm phosphor (an example of the phosphor of the invention) excited with X-rays, and FIG. 2 shows the emission spectrum of $BaY_2O_4$: 0.002Tb,0.0002Sm phosphor (another example of the phosphor of the invention) excited with X-rays.

Figure 5:
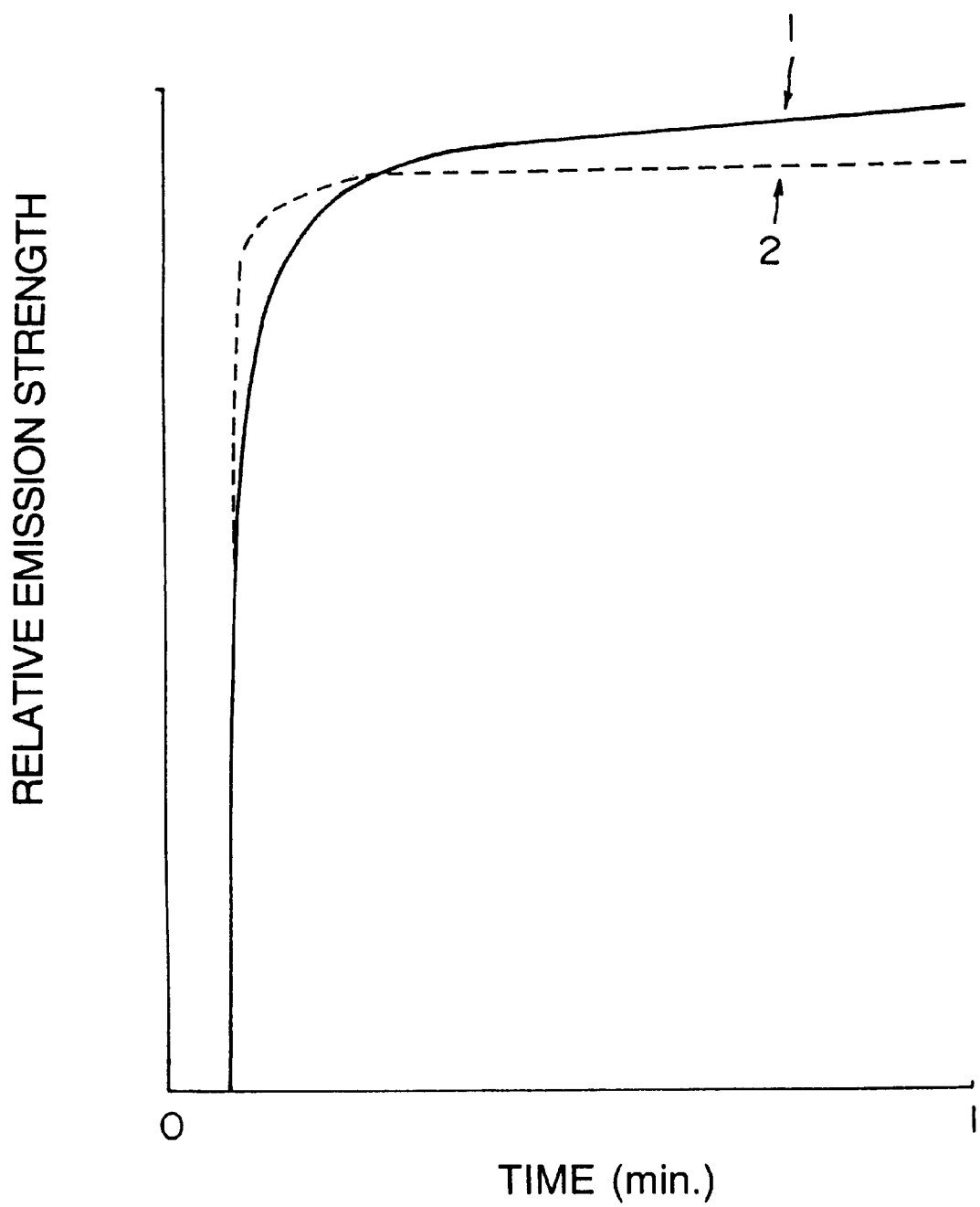
FIG. 5 shows time-dependence of the emission intensity of $BaGd_2O_4$:0.002Tb,0.0002Sm phosphor excited with an X-ray.
Figure 6:
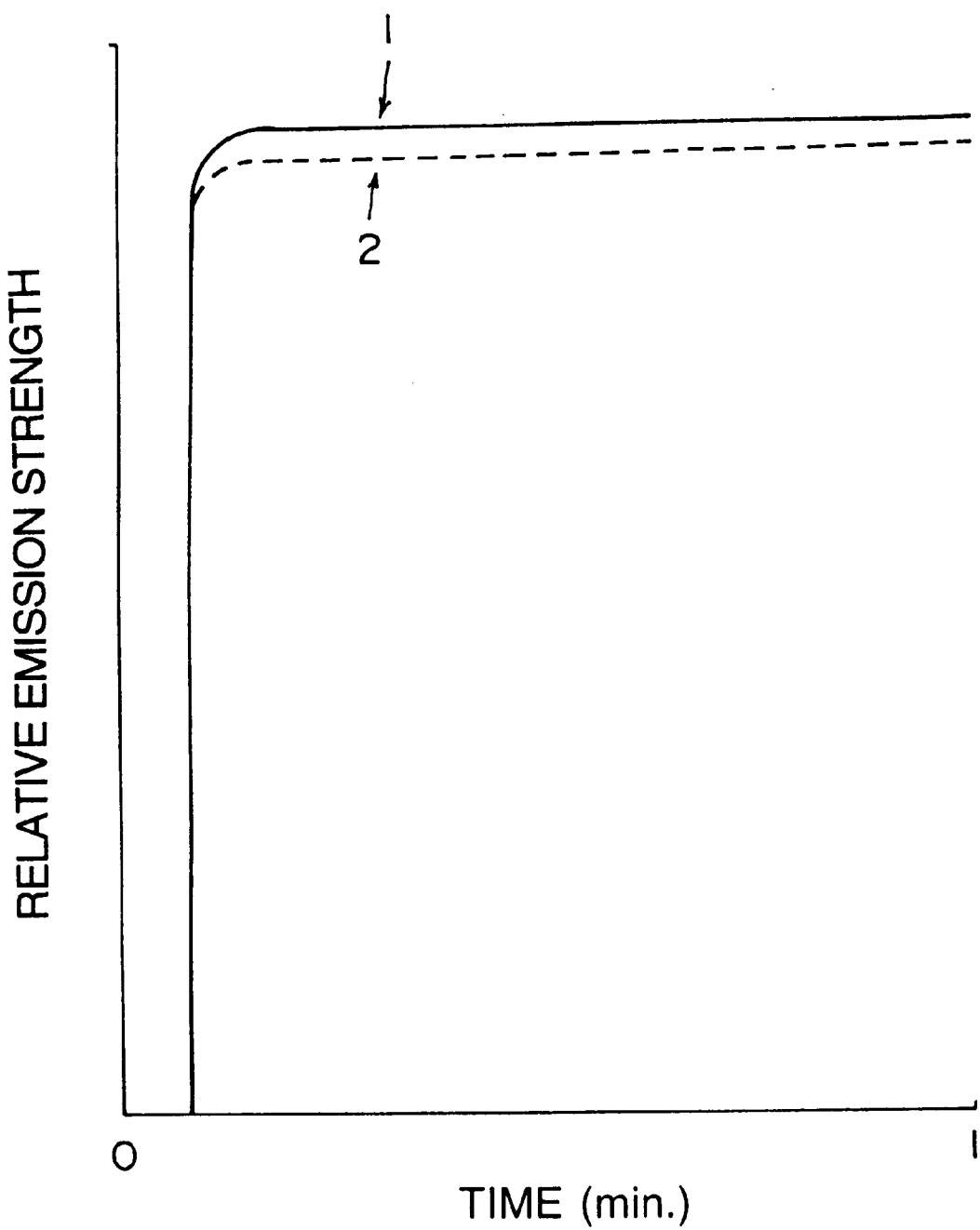
FIG. 6 shows time-dependence of the emission intensity of $BaY_2O_4$:0.002Tb,0.0002Sm phosphor excited with an X-ray.

FIG. 5 shows time-dependence of the emission intensity of $BaGd_2O_4$:0.002Tb,0.0002Sm phosphor excited with X-rays, and FIG. 6 shows time-dependence of the emission intensity of $BaY_2O_4$:0.002Tb,0.0002Sm phosphor excited with X-rays.

In each of FIGS. 5 and 6, the solid line 1 and the dotted line 2 represent green and red luminescent components, respectively.

As shown in FIGS. 1 and 2, the phosphor of the invention gives luminescence comprising green component (approx. at 550 nm) and red one (approx. at 610 nm). The luminescence centers of the green and red components are thought to be $Tb^+$ and $Sm^+$, respectively.

FIG. 5 shows that $BaGd_2O_4$:0.002Tb,0.0002Sm phosphor emits the green luminescent component later than it emits the red one by approx. 0.5 second. In other words, the green component (originating from $Tb^{3+}$) exhibits a slower response to the excitation than the red one (originating from $Sm^{3+}$). Under observation with the human eyes, the red light can be seen immediately after the excitation, and then the green light can be seen approx. 0.5 second later.

FIGS. 1 and 2 show that the ratio between the green and red components varies according to the center metal atoms in the matrix (even if the activators are the same). Accordingly, the time difference between these luminescent components can be controlled by optimizing the conditions of the phosphor matrix (e.g., by selecting the center metal atoms and/or by adjusting the ratio thereof). Actually, as shown in FIG. 6, $BaY_2O_4$:0.002Tb, 0.0002Sm phosphor (which emits luminescence comprising the red component in a more amount than $BaGd_2O_4$:0.002Tb, 0.0002Sm phosphor) gives the green and red luminescent components with a time difference much shorter than 0.5 second.

Further, in the case where the phosphor is excited with UV light, the excitation maximums for the green and red components are approx. 315 nm and approx. 408 nm, respectively. Accordingly, it is possible to selectively excite the phosphor so that the green or red component can be predominantly obtained.

Since the phosphor of the invention emits dichromatic luminescence with a time difference, it can be advantageously applied for various uses such as display material, a switching device, a delay device, and fluorescent material. For example, a display device (e.g., CRT) comprising the phosphor can give rapid color changing between a red color and a green color.

Further, the phosphor also can be used for a switching device (which works for switching between "on" and "off") or a delay device (which works for making a delay of signals). In that case, the device comprising the phosphor is combined with proper photo-electric converters. For example, since the green light radiates from the phosphor later than the red light by less than one second, a converter sensitive to not red light but green light and another converter sensitive to not green light but red light are used in combination. These converters are placed near the device, and then the device is exposed to exciting light through a shutter. Examples of the light source include a xenon lamp. The exposed device emits red light and green light with a time difference, and each corresponding converter receives and converts the emitted light into an electric signal. The signal from each converter is beforehand assigned to "on" or "off" state. For example, the signal from the converter for red light is assigned to "on" state (namely, the signal from the converter for green light is assigned to "off" state). Thus, a rapid switching between "on" and "off" states can be performed.

The present invention is further described by the following examples.

EXAMPLE 1

$BaGd_2O_4$:0.002Tb,0.0002Sm phosphor

BaO (15.33 g, 0.1 mol), $Gd_2O_3$ (36.25 g, 0.1 mol), $Tb_2O_3$ (0.0366 g, $1\times10^{-4}$ mol) and $Sm_2O_3$ (0.0035 g, $1\times10^{-5}$ mol) were placed in a mortar, and pulverized and mixed. The mixture was further mixed for 15 minutes with a turbuler, and put in a crucible. The crucible was placed in an electric furnace, and the furnace was evacuated for 30 minutes. Nitrogen gas was introduced into the furnace until the pressure reached to 1 atm. The temperature in the furnace was then increased to 1,200° C. at a rate of 20° C./minute, and kept at 1,200° C. for 3 hours. After that, the furnace was cooled at a rate of 20° C./minute. The product was taken out, and pulverized to obtain the titled phosphor of the invention. The matrix ($BaGd_2O_4$) of the obtained phosphor was confirmed by X-ray diffraction measurement.

EXAMPLE 2

$BaY_2O_4$:0.002Tb,0.0002Sm phosphor

The procedure of Example 1 was repeated except for using $Y_2O_3$ (22.58 g, 0.1 mol) in place of $Gd_2O_3$, to prepare the titled phosphor.

EXAMPLE 3

SrGd$_2$O$_4$:0.002Tb,0.0002Sm phosphor

The procedure of Example 1 was repeated except for using SrO (10.36 g, 0.1 mol) in place of BaO, to prepare the titled phosphor.

EXAMPLE 4

SrY$_2$O$_4$:0.002Tb,0.0002Sm phosphor

The procedure of Example 1 was repeated except for using SrO (10.36 g, 0.1 mol) and Y$_2$O$_3$ (22.58 g, 0.1 mol) in place of BaO and Gd$_2$O$_3$, respectively, to prepare the titled phosphor.

Comparison Example 1

BaGd$_2$O$_4$:0.002Tb phosphor

The procedure of Example 1 was repeated except for not using Sm$_2$O$_3$, to prepare the titled phosphor.

Comparison Example 2

BaGd$_2$O$_4$:0.0002Sm phosphor

The procedure of Example 1 was repeated except for not using Tags, to prepare the titled phosphor.

EVALUATION OF PHOSPHORS

Emission property of each prepared phosphor was evaluated in the following manner.

Each phosphor prepared in Examples 1 to 4 was excited with an X-ray (40 kVp, 30 mA), and the emission spectrum was observed. The time-dependence of the emission intensity of each phosphor excited with an X-ray (40 kVp, 30 mA) was also measured. Further, each phosphor prepared in Comparison Examples 1 and 2 was excited with UV light, and the emission spectrum was obtained. The results are shown in FIGS. 1 to 10.

Figure 3:
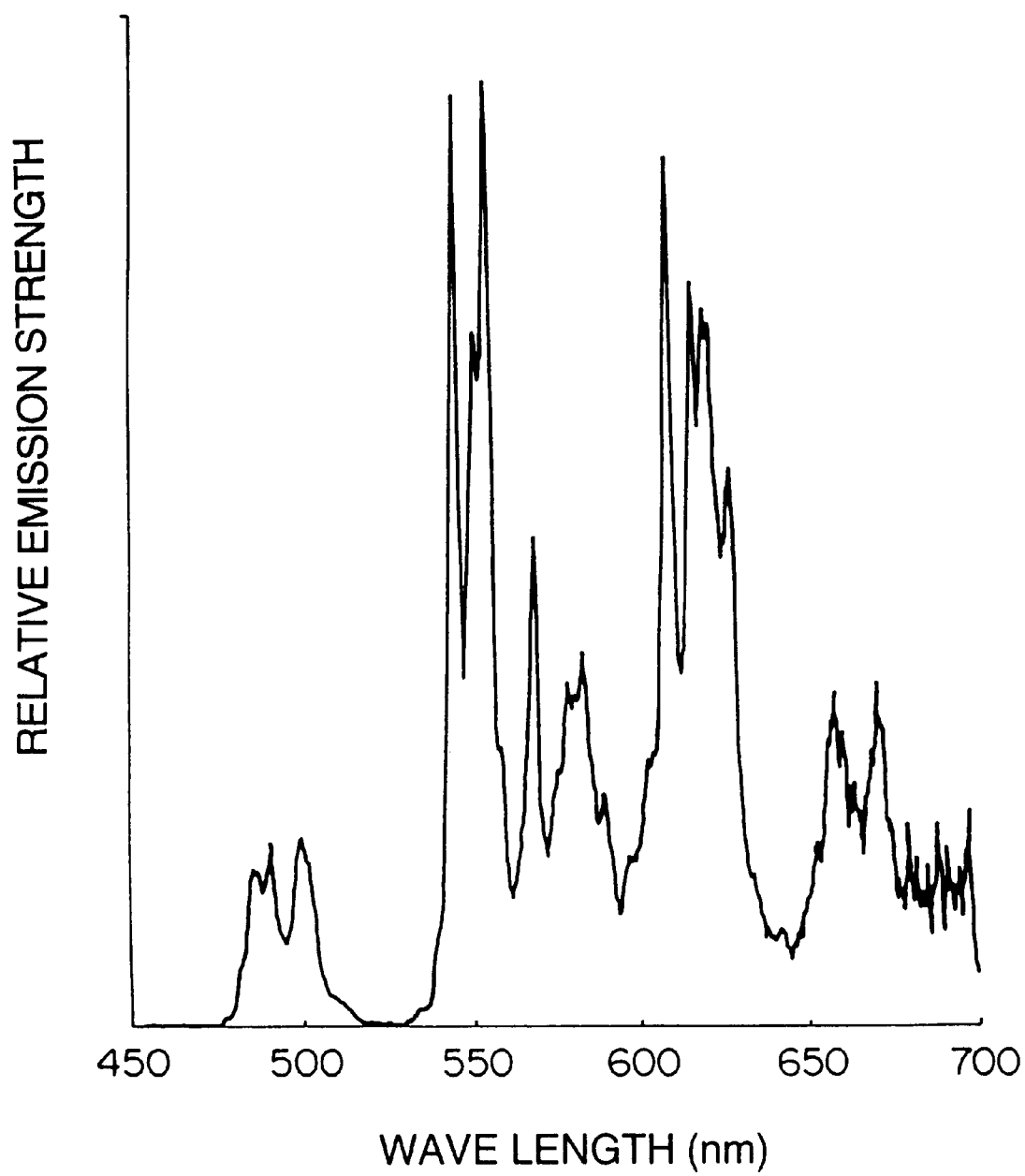
FIG. 3 shows the emission spectrum of $SrGd_2O_4$: 0.002Tb,0.0002Sm phosphor (Example 3) excited with X-rays.

FIG. 1 shows the emission spectrum of BaGd$_2$O$_4$:0.002Tb,0.0002Sm phosphor (Example 1) excited with X-rays, and FIG. 2 shows the emission spectrum of BaY$_2$O$_4$:0.002Tb,0.0002Sm phosphor (Example 2) excited with X-rays. FIG. 3 shows the emission spectrum of SrGd$_2$O$_4$:0.002Tb,0.0002Sm phosphor (Example 3) excited with X-rays, and FIG. 4 shows the emission spectrum of SrY$_2$O$_4$:0.002Tb,0.0002Sm phosphor (Example 4) excited with X-rays.

Figure 7:
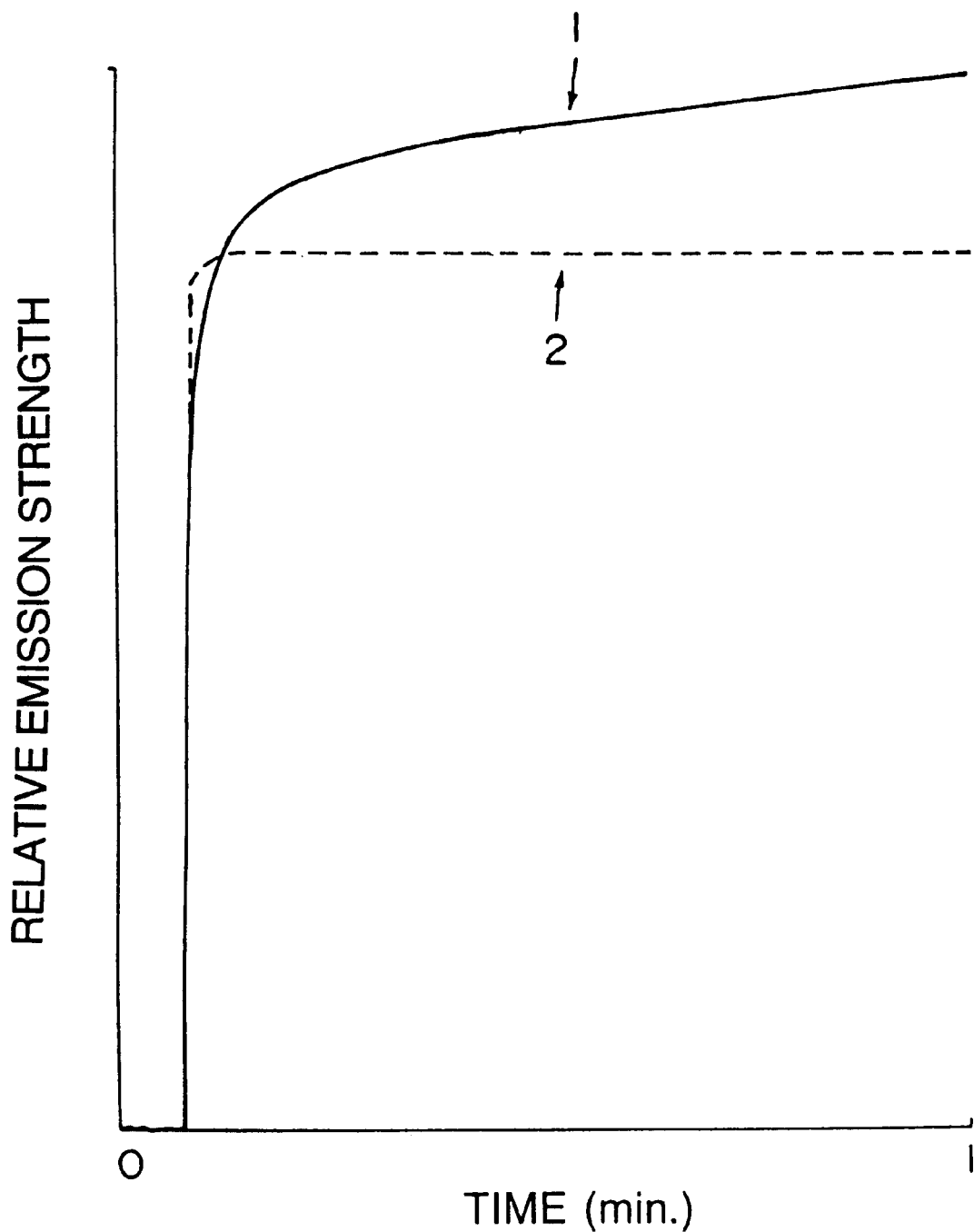
FIG. 7 shows time-dependence of the emission intensity of $SrGd_2O_4$:0.002Tb,0.0002Sm phosphor excited with X-rays.
Figure 8:
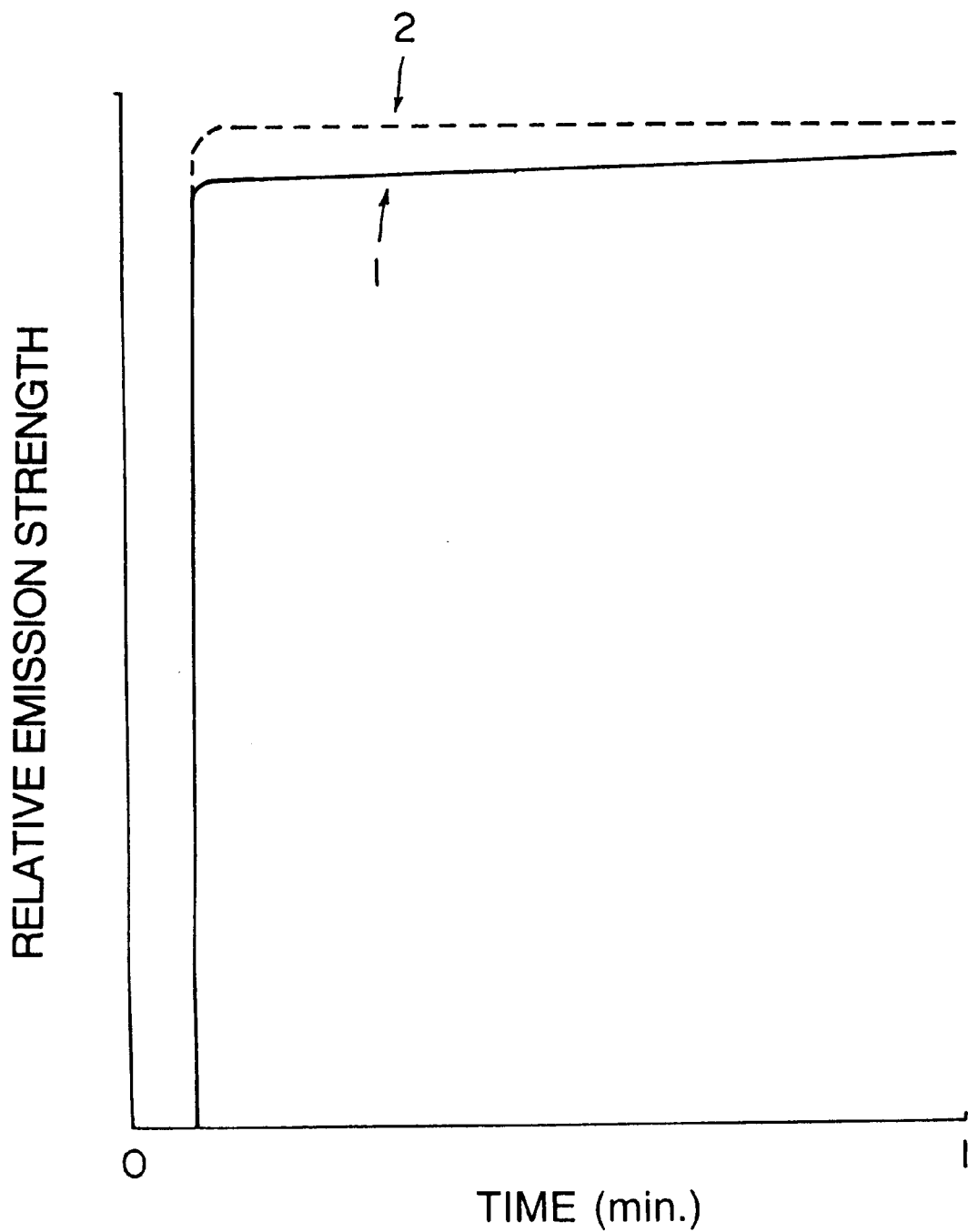
FIG. 8 shows time-dependence of the emission intensity of $SrY_2O_4$:0.002Tb,0.0002Sm phosphor excited with X-rays.

FIG. 5 shows time-dependence of the emission intensity of BaGd$_2$O$_4$:0.002Tb,0.0002Sm phosphor excited with X-rays, and FIG. 6 shows time-dependence of the emission intensity of BaY$_2$O$_4$:0.002Tb,0.0002Sm phosphor excited with X-rays. FIG. 7 shows time-dependence of the emission intensity of SrGd$_2$O$_4$:0.002Tb,0.0002Sm phosphor excited with X-rays, and FIG. 8 shows time-dependence of the emission intensity of SrY$_2$O$_4$:0.002Tb,0.0002Sm phosphor excited with X-rays. In each of FIGS. 5 to 8, the solid line 1 and the dotted line 2 represent green and red luminescent components, respectively.

Figure 9:
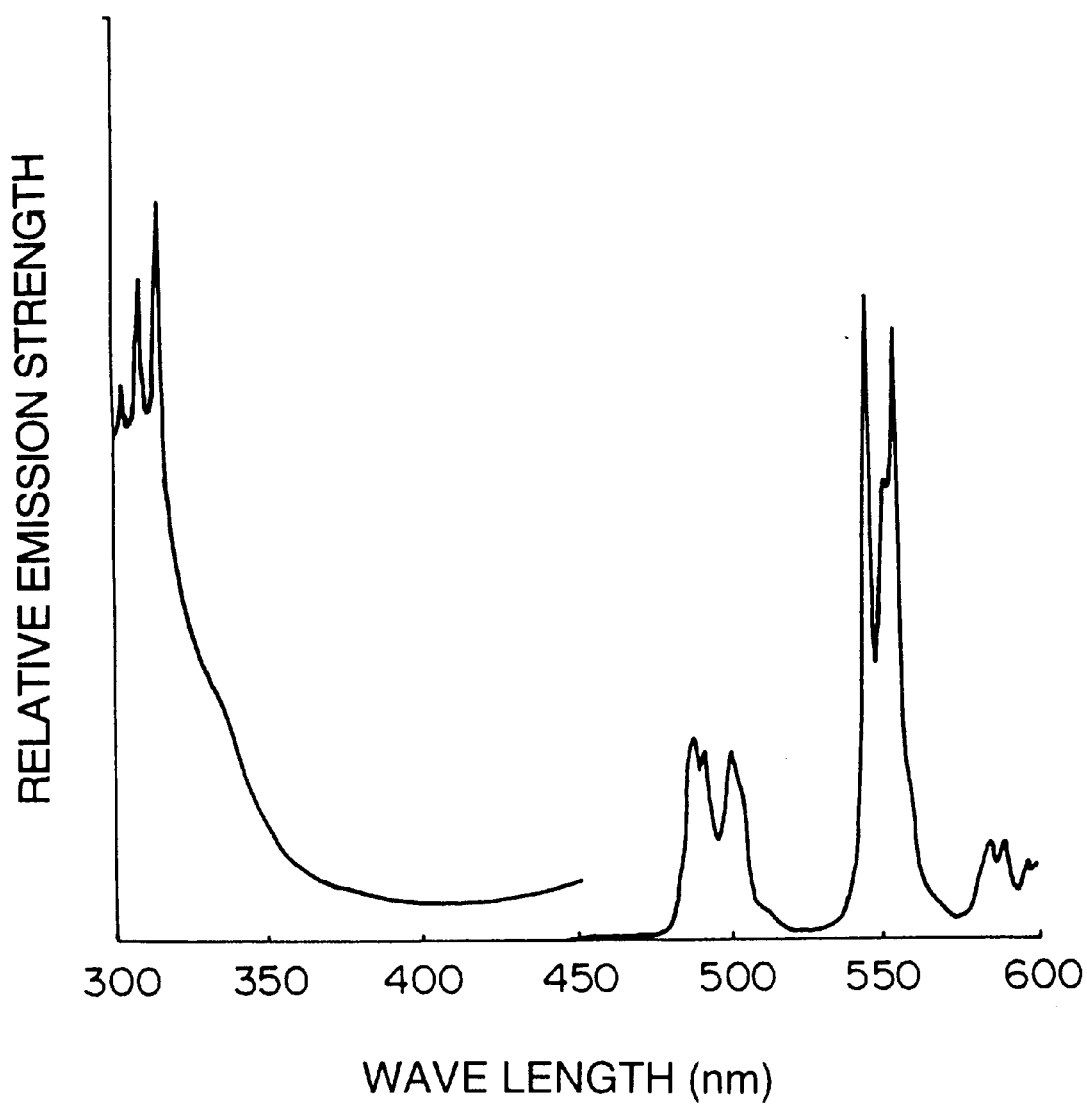
FIG. 9 shows the emission and excitation spectra of $BaGd_2O_4$:0.002Tb,0.0002Sm phosphor (Comparison Example 1) excited with UV light [excitation wavelength for monitoring the emission: 315 nm, emission wavelength for monitoring the excitation: 555 nm].
Figure 10:
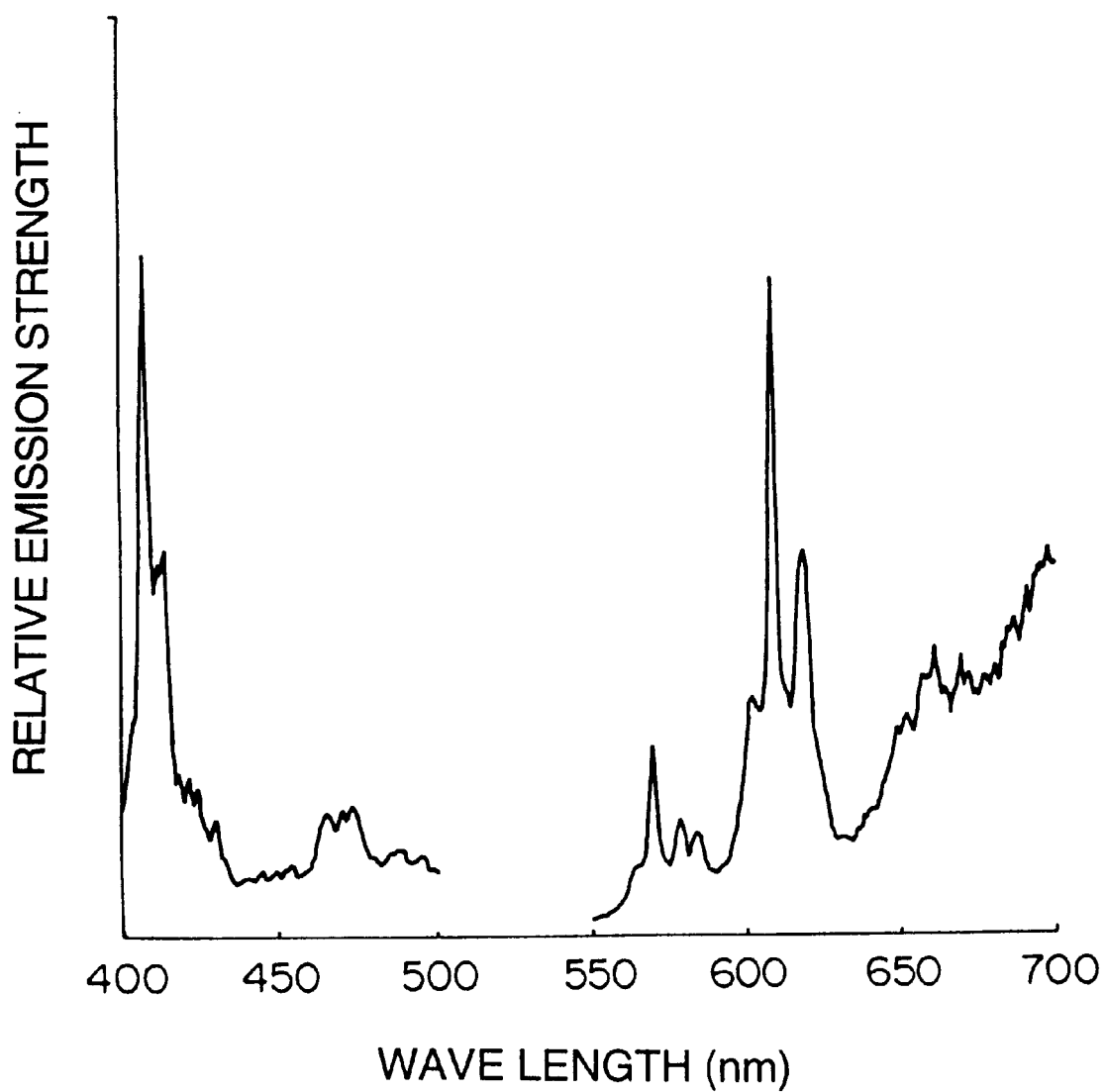
FIG. 10 shows the emission and excitation spectra of $BaGd_2O_4$:0.0002Sm phosphor (Comparison Example 2) excited with UV light [excitation wavelength for monitoring the emission: 408 nm, emission wavelength for monitoring the excitation: 608 nm].

FIG. 9 shows the emission and excitation spectra of BaGd$_2$O$_4$:0.002Tb phosphor (Comparison Example 1) excited with UV light [excitation wavelength for monitoring the emission: 315 nm, emission wavelength for monitoring the excitation: 555 nm]. FIG. 10 shows the emission and excitation spectra of BaGd$_2$O$_4$:0.0002Sm phosphor (Comparison Example 2) excited with UV light [excitation wavelength for monitoring the emission: 408 nm, emission wavelength for monitoring the excitation: 608 nm].

Figure 4:
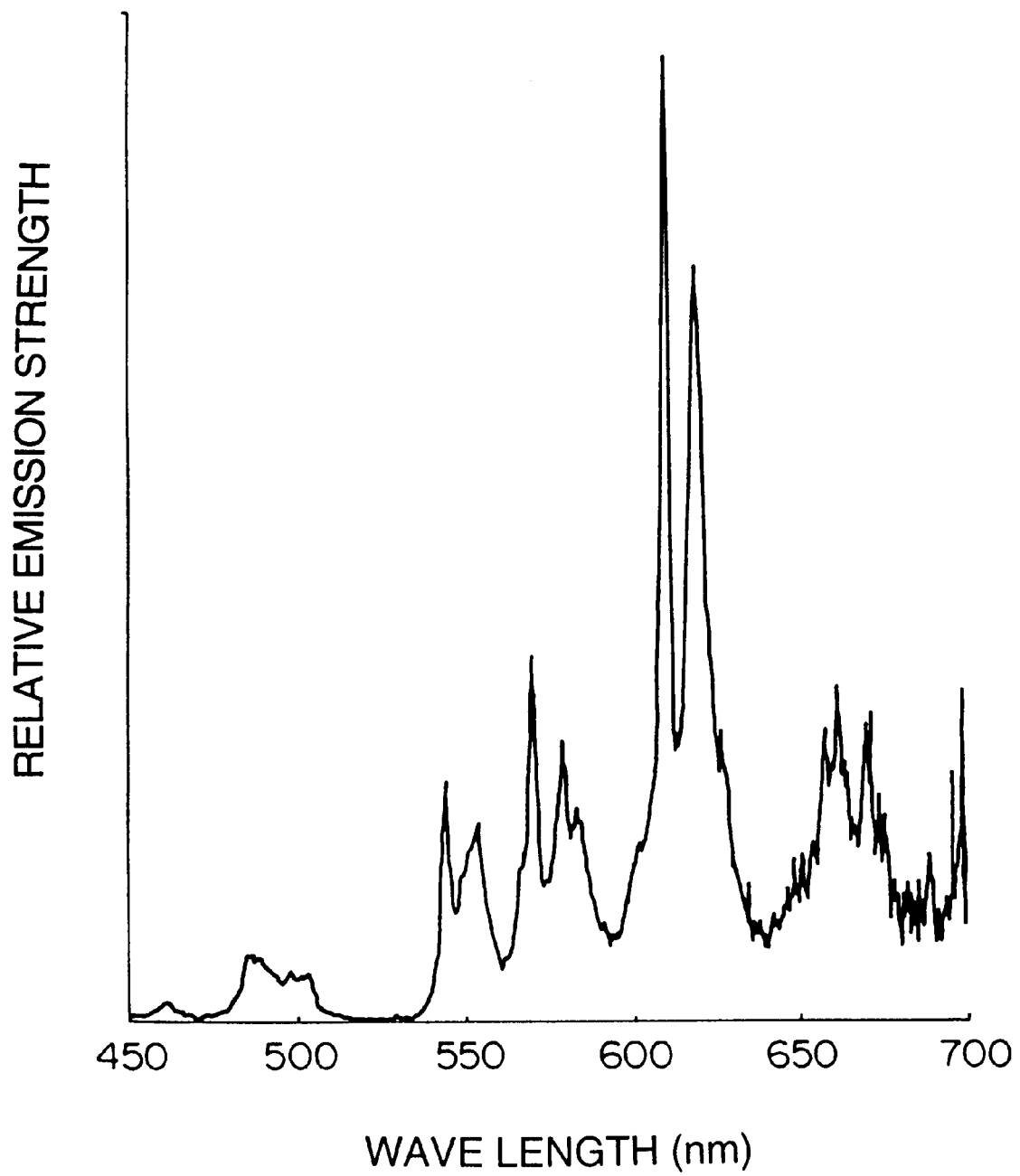
FIG. 4 shows the emission spectrum of $SrY_2O_4$: 0.002Tb, 0.0002Sm phosphor (Example 4) excited with X-rays.

As shown in FIGS. 1 and 4, each M$^{II}$M$^{III}_2$:0.002Tb, 0.0002Sm phosphor of the invention gives luminescence comprising green component (approx. 550 nm) and red one (approx. 610 nm). The luminescence centers of the green and red components are thought to be Tb$^{3+}$ and Sm$^{3+}$, respectively. This is suggested by FIGS. 9 and 10, which show that BaGd$_2$O$_4$:0.002Tb and BaGd$_2$O$_4$:0.0002Sm phosphors (Comparison Examples 1 and 2) emit luminescence at 555 nm and 608 nm, respectively. FIGS. 1 and 2 also show that the ratio between the green and red components varies according to the center metal atoms in the matrix (even if the activators are the same).

FIGS. 5 and 7 show that each M$^{II}$M$^{III}_2$:Tb,Sm phosphor of the invention emits the green component later than it emits the red one. The time difference between them is approx. 0.5 second in BaGd$_2$O$_4$:0.002Tb,0.0002Sm phosphor (FIG. 5). However, in FIGS. 6 and 8, the time difference is much shorter than that in FIG. 5. This means that the time difference between the red and green luminescent components can be controlled by selecting the center metal atoms.

Further, FIGS. 9 and 10 show that the excitation maximums in UV region for the green and red components are approx. 315 nm and approx. 408 nm, respectively. Accordingly, it is possible to selectively excite the phosphor so that the green or red luminescent component can be predominantly obtained.

What is claimed is:

1. A method for displaying plural colors with time difference which comprises applying radiation of an appropriate wavelength to a terbium-samarium co-activated alkaline earth metal rare earth oxide phosphor which is composed of a composition of the formula (I):

$$M^{II}M^{III}_2O_4{:}xTb,ySm \qquad (I)$$

in which M$^{II}$ is at least one alkaline earth metal element selected from the group consisting of Mg, Ca, Sr and Ba; M$^{III}$ is at least one rare earth element selected from the group consisting of Y, La, Gd and Lu; and x and y are numbers satisfying the conditions of $0<x\leq0.1$ and $0<y\leq0.1$, respectively, to produce with time difference plural emissions of different wavelengths.

2. The method of claim 1, wherein M$^{II}$ in the formula (I) is at least one of Sr and Ba, and M$^{III}$ in the formula (I) is at least one of Y and Gd.

3. A method for transmitting plural signals with time difference which comprises applying radiation of an appropriate wavelength to a terbium-samarium co-activated alkaline earth metal rare earth oxide phosphor which is composed of a composition of the formula (I)

$$M^{II}M^{III}_2O_4{:}xTb,ySm \qquad (I)$$

in which M$^{II}$ is at least one alkaline earth metal element selected from the group consisting of Mg, Ca, Sr and Ba; M$^{III}$ is at least one rare earth element selected from the group consisting of Y, La, Gd and Lu; and x and y are numbers satisfying the conditions of $0<x\leq0.1$ and $0<y\leq0.1$, respectively, to produce with time difference plural emissions of different wavelengths and collecting the plural emissions separately by plural photoelectric conversion elements which emit electric signals with time difference.

4. The method of claim 3, wherein $M^{II}$ in the formula (I) is at least one of Sr and Ba, and $M^{III}$ in the formula (I) is at least one of Y and Gd.

5. A terbium-samarium co-activated alkaline earth metal rare earth oxide phosphor comprising the composition represented by the formula (I'):

$$M^{II}M^{III}{}_2O_4{:}xTb{,}ySm \qquad (I')$$

in which $M^{II}$ is at least one alkaline earth metal element selected from the group consisting of Mg, Ca and Sr; $M^{III}$ is at least one rare earth element selected from the group consisting of Y, La, Gd and Lu; and x and y are numbers satisfying the conditions of $0.0001 < x \leq 0.01$ and $0.0000 < y \leq 0.001$, respectively.

6. The terbium-samarium co-activated alkaline earth metal rare earth oxide phosphor of claim 5, wherein $M^{II}$ in the formula (I') is Sr.

7. The terbium-samarium co-activated alkaline earth metal rare earth oxide phosphor of claim 5, wherein $M^{III}$ in the formula (I') is at least one of Y and Gd.

8. A terbium-samarium co-activated barium rare earth oxide phosphor comprising the composition represented by the formula (I"):

$$BaM^{III}{}_2O_4{:}xTb{,}ySm \qquad (I'')$$

in which $M^{III}$ is at least one rare earth element selected from the group consisting of Y, La and Lu; and x and y are numbers satisfying the conditions of $0 < x \leq 0.1$ and $0 < y \leq 0.1$, respectively.

9. The terbium-samarium co-activated barium rare earth oxide phosphor of claim 8, wherein $M^{III}$ in the formula (I") is Y.

* * * * *